United States Patent
Britton

(10) Patent No.: US 7,035,528 B1
(45) Date of Patent: Apr. 25, 2006

(54) PROVIDING AUDIENCE FLOW IN A PERSONAL TELEVISION DEVICE

(75) Inventor: Layne Britton, Marina Del Rey, CA (US)

(73) Assignee: Digital Networks North America, Inc., Cupertino, CA (US)

(*) Notice: Subject to any disclaimer, the term of this patent is extended or adjusted under 35 U.S.C. 154(b) by 0 days.

(21) Appl. No.: 09/412,993

(22) Filed: Oct. 5, 1999

(51) Int. Cl.
*H04N 5/91* (2006.01)
*H04N 7/04* (2006.01)

(52) U.S. Cl. .............................. 386/83; 386/95; 386/92

(58) Field of Classification Search ................. 386/83, 386/92, 46, 1, 52, 55, 4, 95; 725/10, 9, 22, 725/87, 86
See application file for complete search history.

(56) References Cited

U.S. PATENT DOCUMENTS

| | | | |
|---|---|---|---|
| 4,682,248 A | 7/1987 | Schwartz | |
| 4,972,396 A | 11/1990 | Rafner | |
| 5,541,738 A * | 7/1996 | Mankovitz | 386/83 |
| 2002/0012525 A1 | 1/2002 | Yuen et al. | |

FOREIGN PATENT DOCUMENTS

| | | |
|---|---|---|
| WO | WO 99/52279 A1 | 10/1999 |
| WO | WO 00/07368 A1 | 2/2000 |
| WO | WO 00/18108 A2 | 3/2000 |
| WO | WO 00/28736 A1 | 5/2000 |
| WO | WO 00/58833 A1 | 10/2000 |
| WO | WO 00/58834 A1 | 10/2000 |
| WO | WO 00/58967 A1 | 10/2000 |
| WO | WO 00/59214 A1 | 10/2000 |
| WO | WO 00/62298 A1 | 10/2000 |
| WO | WO 00/62299 A1 | 10/2000 |
| WO | WO 00/65233 A1 | 10/2000 |
| WO | WO 00/67475 A1 | 11/2000 |
| WO | WO 01/06370 A1 | 1/2001 |
| WO | WO 01/22729 A1 | 3/2001 |
| WO | WO 01/46843 A2 | 6/2001 |
| WO | WO 01/47238 A2 | 6/2001 |
| WO | WO 01/47249 A2 | 6/2001 |
| WO | WO 01/47279 A2 | 6/2001 |
| WO | WO 01/65762 A2 | 9/2001 |
| WO | WO 01/65862 A2 | 9/2001 |
| WO | WO 01/89203 A2 | 11/2001 |

* cited by examiner

*Primary Examiner*—Robert Chevalier
(74) *Attorney, Agent, or Firm*—McDonnell Boehnen Hulbert & Berghoff LLP

(57) ABSTRACT

A method and apparatus for encouraging audience flow. In the described embodiment, a user selects a program for recording. In addition to recording the selected program, the recording device records an additional program. In certain embodiments, the additional program may be the program that is broadcast immediately following the requested program. In other embodiments, the two programs may be linked (for example, by linking codes in a program guide).

6 Claims, 6 Drawing Sheets

PROVIDING AUDIENCE FLOW IN A PERSONAL TELEVISION DEVICE

BACKGROUND OF THE INVENTION

Audience flow is a term used in television broadcasting to refer to the carry over of an audience from one program to the next. Audience flow is used by networks to promote new shows (by scheduling a new show to follow a highly rated show in order to provide exposure to the new show); to attempt to increase ratings of one show by having it follow a highly rated show; to maintain an audience by running a series of similar shows during a time period (sometimes referred to as "block programming"), etc.

According to one report (see, "The future: Everything you know about media will change radically", The Meyers Group, 1998, hereinafter the "Meyers Group Report"), broadcast television's ratings (based on 24 hour audience share) is eroding from an 82% level in 1975 to an estimated 28% level in 2005. This report suggests that the erosion is due to the increased number of channels that are available to the viewer with the advent of cable and satellite television. According to the increased number of channels and amount of programming available leads to increased levels of "channel surfing" and less control over the audience by the broadcasters. As stated by the report:

"The television season, audience "flow" and network exclusivity are outdated concepts. The are vestiges of 30-year-old network programming strategies that are no longer relevant . . . "

And, the report concludes by stating:

"To remain competitive, networks must develop innovative yearlong and multinetwork original programming strategies. They must adapt to the reality that every half-hour, every night, every program has its own set of coordinates on the television map."

These conclusions were reached even before the market launch of the so-called personal television. Personal television, such as the Replay TV 2001, 2003 and 2004 personal television devices, allow a viewer to easily time-shift programming by selecting programming to be recorded for later viewing. Thus, a viewer may select to record all episodes of "Home Improvement", all episodes of "Star Trek", all political commentary programming, and all programming regarding cooking shows. The selected programming is recorded and may be viewed in any order or sequence desired by the viewer. Thus, these personal television devices may further disrupt audience flow.

Many broadcasters would prefer to be able to continue to benefit from audience flow.

Thus, what is needed is a method to provide for audience flow even with the advent of new technologies such as personal television.

SUMMARY OF THE INVENTION

A method and apparatus for encouraging audience flow in which a user selects a program for recording. In addition to recording the selected program, the recording device records an additional program. In certain embodiments, the additional program may be the program that is broadcast immediately following the requested program. In other embodiments, the two programs may be linked (for example, by linking codes in a program guide).

Figure 1:
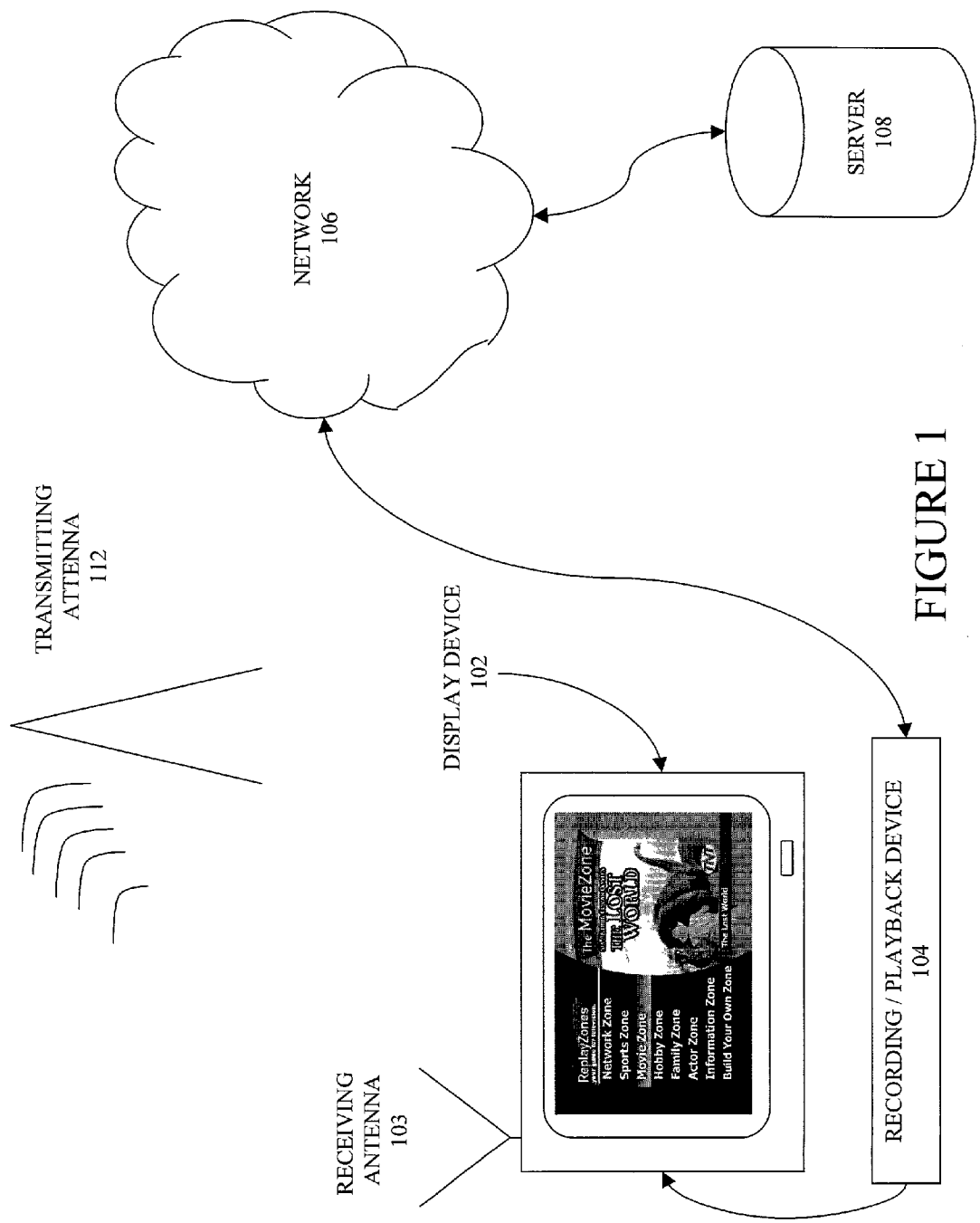
FIG. 1 is an overall network diagram of a network as may implement an embodiment of the present invention.
Figure 3:
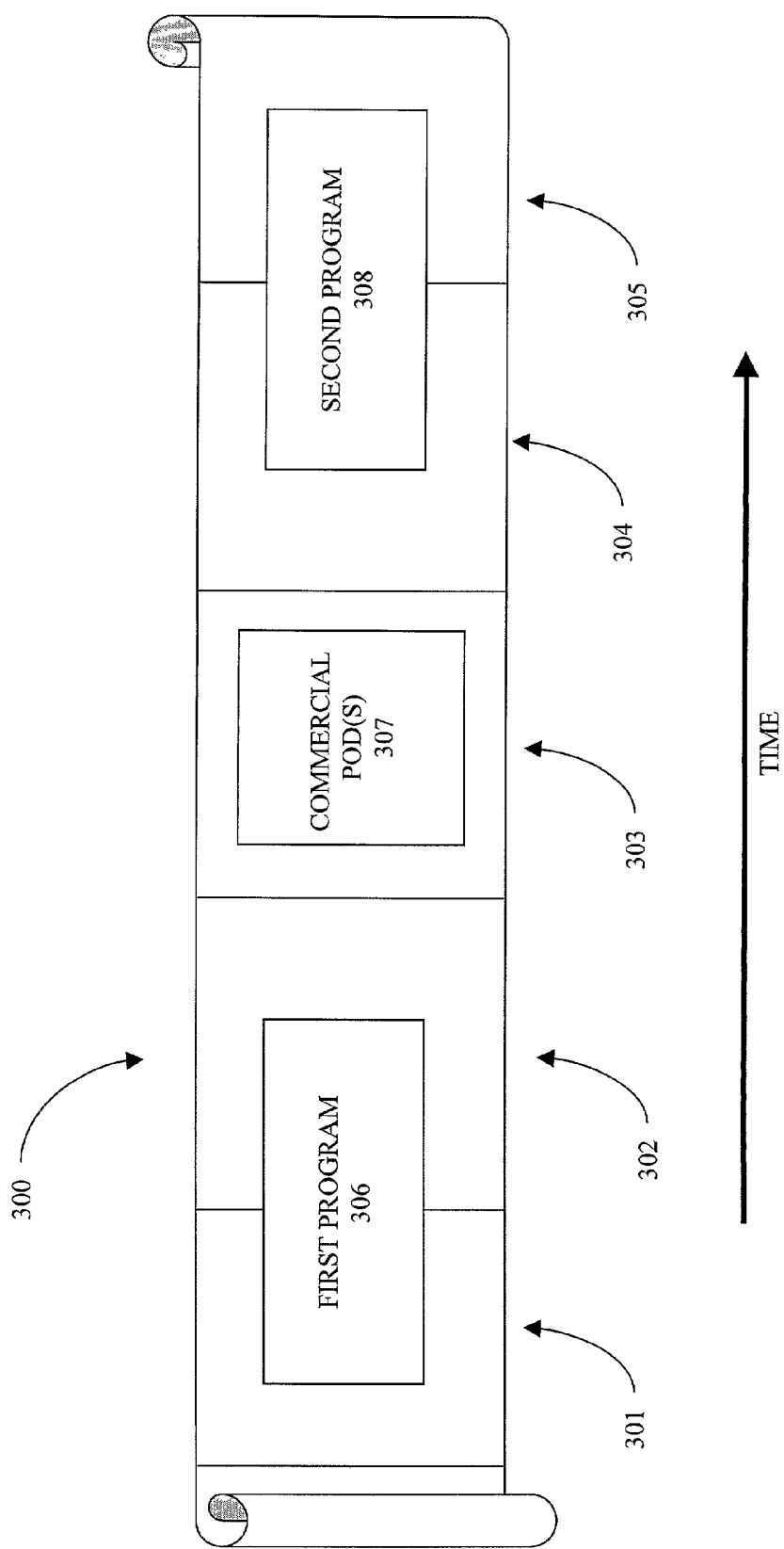
FIG. 3 is an illustration of a video sequence including a first program, a second program and a commercial pod.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS THE PRESENT INVENTION

Video Tape Recorders and Personal Television The described invention has application in video playback devices such as conventional video tape recorders (VTRs) as well as emerging Personal Television (PTV) devices. Embodiments of a commercially available PTV are available as the Replay TV 2001, 2003 and 2004 personal television devices.

Embodiments of personal television devices are further described in co-pending U.S. Patent Applications:

Ser. No. 09/130,994 filed Aug. 7, 1998 titled "Video Data Recorder with Integrated Channel Guides";

Ser. No. 09/131,092 filed Aug. 7, 1998 titled "Video Data Recorder for Recording Predefined Format Shows";

Ser. No. 09/131,091 filed Aug. 7, 1998 titled "Video Data Recorder with Personal Channels"; and Ser. No. 09/262,144 filed Mar. 3, 1999 titled "Digital Recording and Playback" which is a continuation of U.S. patent application Ser. No. 09/132,690 filed Aug. 11, 1998;

all of which are incorporated herein by reference.

FIG. 1 provides a high level illustration of a network as may implement the present invention. The illustrated network comprises a display device 102. In the described embodiment the display device 102 is a television; however, in alternative embodiments, the display device 102 may another type of device such as a monitor. The display device 102 is coupled to receive television programming conventionally such as over-the-air (as illustrated by use of the receiving antenna 103 and transmitting antenna 112), over a cable television system, or over a satellite television system (or all or any combination of these.)

Figure 2:
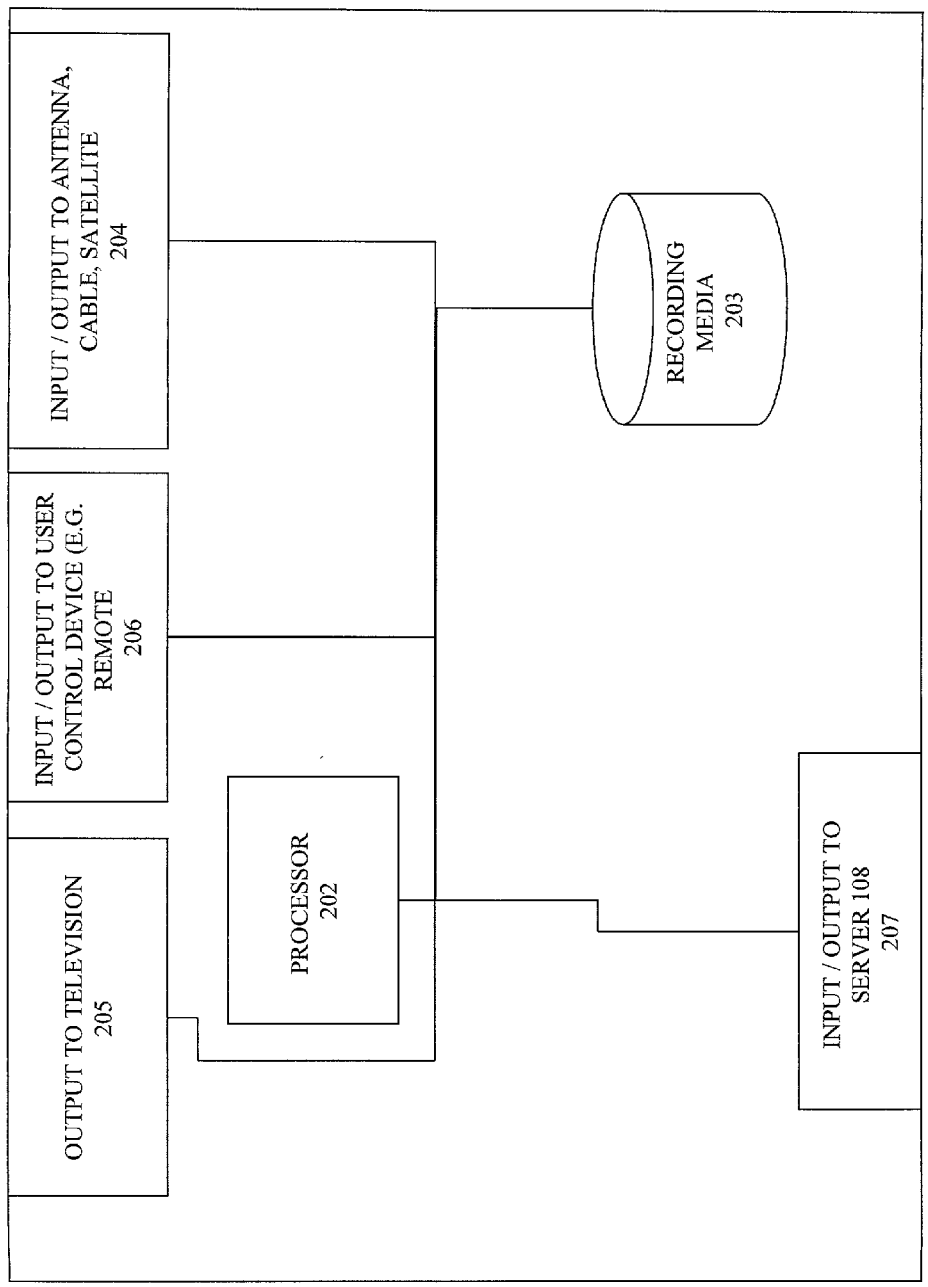
FIG. 2 is a high level block diagram of a recording and playback device as may be implemented by an embodiment of the present invention.

A recording and playback device 104 is coupled with the television and is also coupled to receive the television signal. The recording and playback device is shown in high-level block diagram form in FIG. 2. FIG. 2 will be described in greater detail below.

Turning back to FIG. 1, the recording and playback device 104 is coupled in communication with a server 108. In the described embodiment, the coupling is through a network 106. The recording and playback device 104 is coupled by telephonic connection to the network 106 and the server is likewise coupled by telephonic connection to the network 106. The network 106 may be the internet or some other distributed network. Other couplings between the server 108 and the network may be utilized. For example, a wireless connection may be utilized or a connection through a cable plant may be utilized.

In any event, the server 106 is coupled in communication with the recording and playback device 104 so that the server 106 may provide updated information to the recording and playback device 104. The updated information may include information on television programs to be broadcast on bandwidth 112. Some of the television program information that may be broadcast will be described in greater detail with reference to FIG. 4. As will be described, the television program information may, in certain embodiments, include linking information 404 and 405 for linking of one program to another program.

Overview of the Recording/Playback Device 104

FIG. 2 provides a high level block diagram overview of a recording and playback device as may be utilized by an embodiment of the present invention.

As is illustrated, the described embodiment comprises a processor 202 that provides for overall control of the operation of the device 104. The processor may be any of a number of commercially available processors or may be a special purpose processor.

Required programming to control the processor, as well video sequences (e.g., recorded television programs) may be recorded on recording media 203. In the described embodiment, recording media 203 is a disk drive but in other embodiments may be another type of recording device and in certain embodiments more than one recording device may be utilized.

The device 104 further comprises input and output connections 204–207 allowing for communication between the device 104 and the display device 102, the antenna and/or other program source (e.g., cable, satellite) 103, the server 108 (such as over a telephonic connection to a network 106 as illustrated) and to a user input/output device such as a remote or keyboard.

It should be noted that certain details are omitted from FIG. 2 such as read-only memory and encoders and decoders. However, such details will be apparent to one skilled in the art.

Audience Flow

Turning now to FIG. 3, transmission of television programming content is illustrated, 300. Traditionally, a first program 306 is broadcast over a first set of time periods 301, 302. Following the first program 306, a commercial pod(s) 307 over one or more second time periods 303. Following the commercial pod(s) 307, a second program 308 is broadcast over third time periods 304, 305. Clearly, in certain embodiments, commercials may also be broadcast before and during the first program 306 as well as during and after the second program 308. Further, in certain embodiments, commercials pods may be eliminated altogether.

As was discussed in the background section, broadcasters design the sequence of programs in order to achieve audience flow (e.g., keep a set of viewers) from the first program 306 to the second program 308.

Recording and playback device 104 performs the function of "time shifting"—allowing viewers to record a program, such as program 306, for viewing during a time period different than the time period during which it is broadcast, time periods 301, 302. In certain embodiments, device 104 allows the viewer to select a given program (e.g., the first program 306) for time shifting and, responsive to selection of the program, that program will be recorded onto recording media 203. The viewer then plays the program at a time of the viewer's choosing. Clearly, this time shifting functionality has the capability to disrupt the broadcaster's intended audience flow between the first program 306 and the second program 308.

As has been discussed, the device 104 comprises a programmable processor 202 that operates under control of stored program(s). The program(s) may be stored on recording media 203. As has been discussed, the stored program(s) include first instructions for accepting user input selecting the first program 306 for recording, block 601.

The stored program(s) include second instructions for recording the second program 308 (and, preferably, the first program 306) responsive to the viewer request for recording the first program 306, block 603. The device 104 accepts viewer input selecting the first program for display or playback, block 605 and displays the first program 306 responsive to the viewer input, block 607. In certain embodiments, either before, during or following playback of the first program 306, a promotional for the second program 308 is displayed, block 609. The display of the promotional further promotes audience flow between the first program 306 and the second program 308. Finally, following display of the first program (and, optionally, the promotional and commercial pods), the second program is displayed, block 611.

Figure 6:
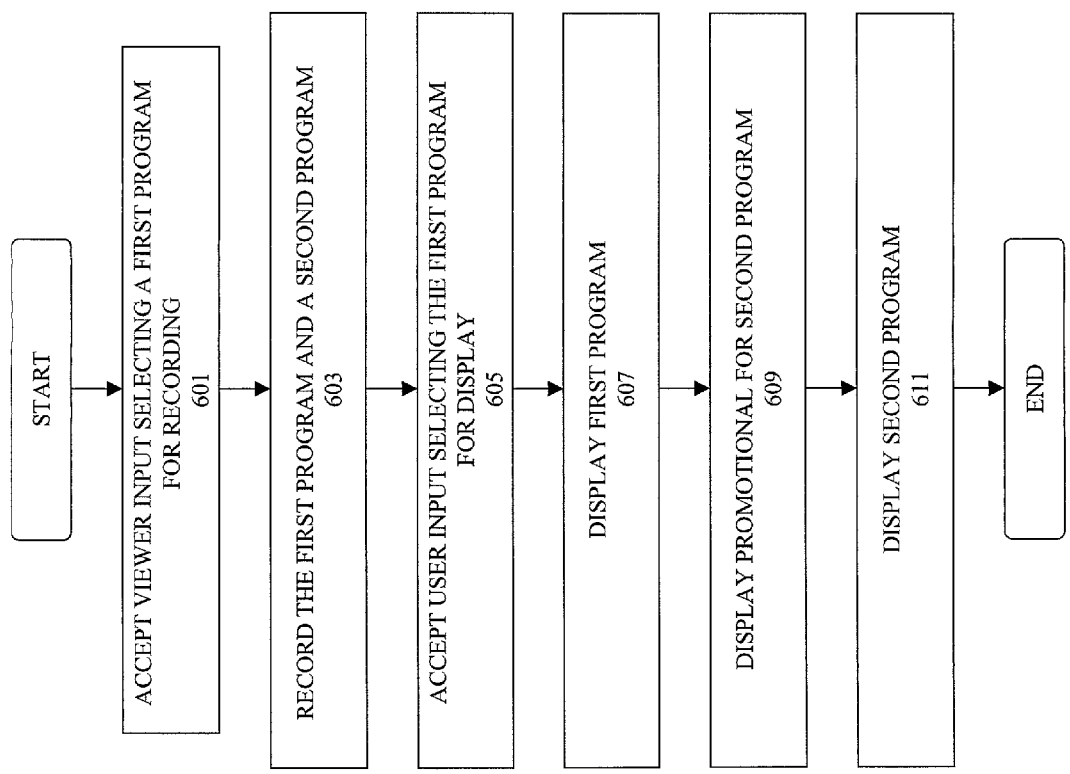
FIG. 6 is an overall flow diagram of a method for recording and playback of programming as may be implemented by an embodiment of the present invention.

Referring back to FIG. 6, step 601, in the described embodiment, the viewer may utilize any of several methods for selection of a first program 306 for recording. For example, the viewer may select the first program using an electronic program guide that is displayed by the device 104 on display device 102. Display and use of an EPG to select programs for recording is described in greater detail in the above-referenced U.S. patent application Ser. No. 09/130, 994. The viewer may also be provided with facilities to select programming by providing functionality to search through the programming guide data based on keyword searches for actor or actress names, director names, show titles, or descriptions.

Figure 5:
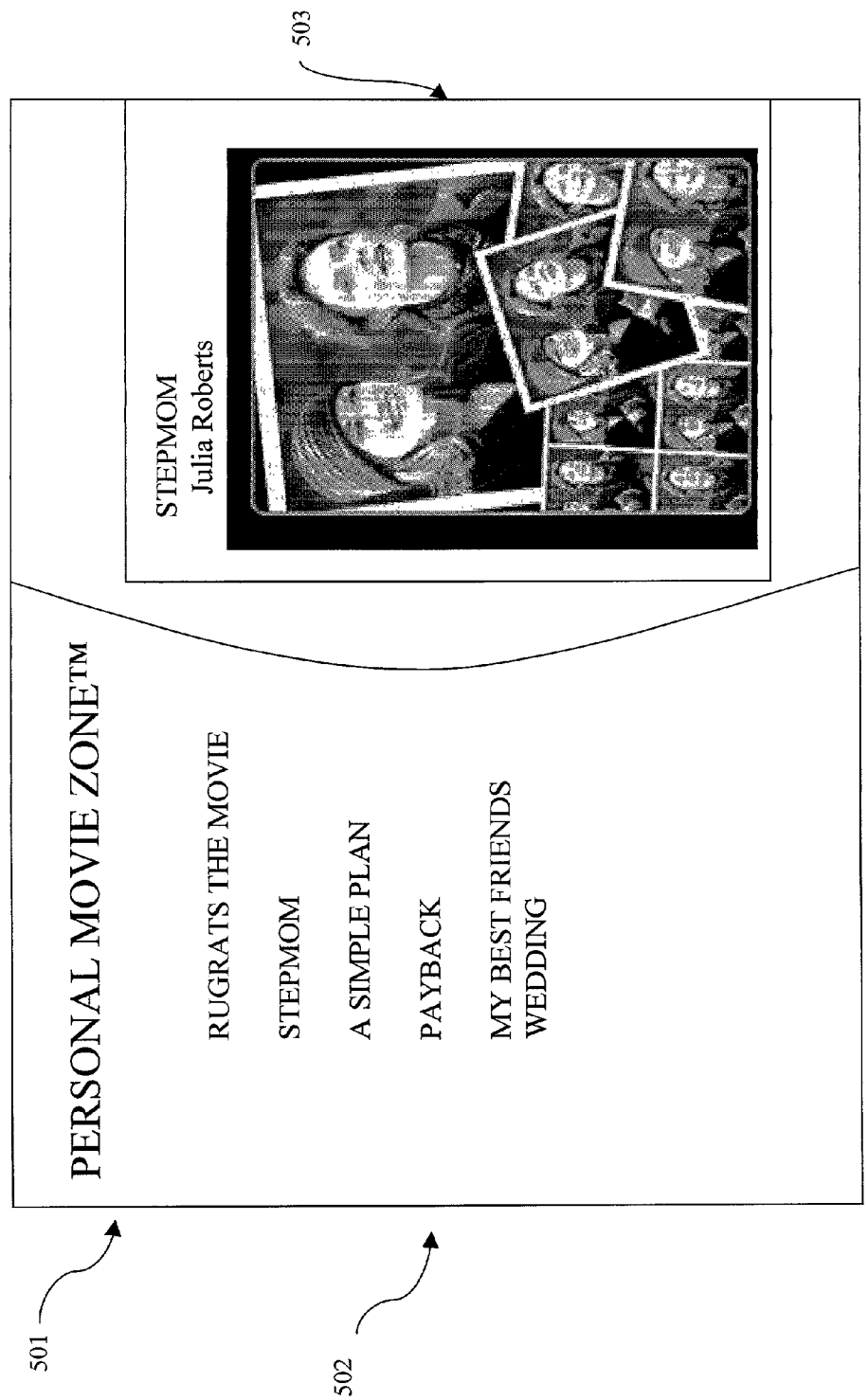
FIG. 5 is an illustration of a user interface useful for program previewing and selection as may be utilized by an embodiment of the present invention.

In addition, in certain embodiments, the viewer may be provided with editorial and promotional guides which allow a viewer to review information on available programming and select programming for recording. An example of an interface for such an embodiment is illustrated with reference to FIG. 5 which illustrates a so-called "zone" used to promote programming. In the particular example, movies are promoted in the personal movie zone 501 by providing a list 502 of available movies. When the viewer selects a particular movie title, a barker area 503, displays additional information on the movie. The viewer may select any particular program (movie) for recording and, in accordance with the teachings of the described embodiment, the recording device 104 will record both the selected program and a second program.

Figure 4:
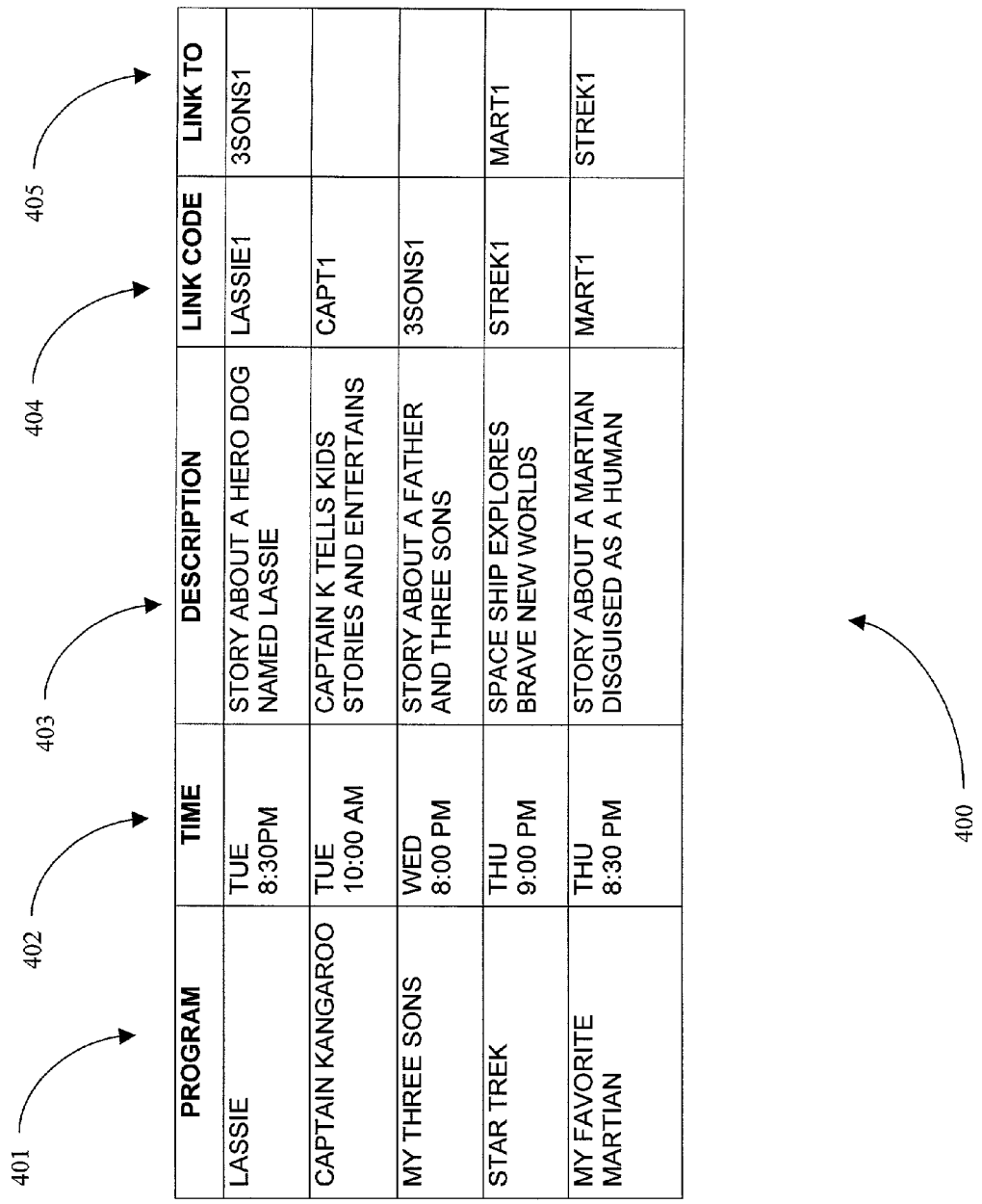
FIG. 4 is an illustration of a programming guide database as may be utilized by an embodiment of the present invention.

Turning back to FIG. 3, in the described example, second program 308 is broadcast following first program 306 immediately in time (for purposes of this disclosure "immediately" is meant to refer to without other intervening programs, but as illustrated by FIG. 3, does not preclude intervening commercials or promotionals.) However, in alternative embodiments, the second program 308 may be broadcast during a time period other than immediately following the first program 306 (either later in time or earlier in time). As is illustrated by FIG. 4, in one alternative embodiment, in addition to conventional information included in the electronic program guide database 400 such as show title 401, broadcast time 402, actor and actress names, descriptive information 403, etc. the database 400 includes a link code 404 and a link to code 405 for each television program. The link code 404 is a code that other programs may use to link to that television program. The link to code 405 indicates a television program that the listed program is linked to. Thus, in the exemplary data of FIG. 4, "Lassie" is linked to "My Three Sons" by including in its link to field 405 "3SONS1" which is the link code 404 for the program "My Three Sons". Similarly, in the described database 400, "Star Trek" is linked to "My Favorite Martian" and visa versa.

Thus, using the technique of the described embodiment, if a viewer selects "Star Trek" for recording, both "Star Trek" and "My Favorite Martian" are recorded. Similarly, if a viewer selects "My Favorite Martian" for recording, "Star Trek" is also recorded. Further, when the viewer selects "Star Trek" for playback, "My Favorite Martian" is also played back.

In certain embodiments, the second show is not recorded under certain conditions. For example, certain embodiments of device 104 provide for only a single tuner. Thus, if the viewer has selected another program for recording during the same time slot as the "second show", these embodiments may opt to respect the viewer's recording wishes. Further, the device 104 may have limited capacity on the recording media 203. Thus, certain embodiments may only record the "second show" where there is adequate recording capacity for both the second show and other programming selected by the viewer.

Co-pending U.S. patent application Ser. No. 09/131,091 describes storing time shifted programming in so-called "personal channels". The personal channels may be titled, for example, with the title of a series (e.g., "Star Trek") that has been chosen for recording. In certain embodiments, the "second program" may be stored in the personal channel for the first program. Thus, in such embodiments, the viewer may readily see, by viewing a list of programming available in the personal channel, the additional programs that have been recorded. In other embodiments, the "second program" may be recorded in its own personal channel but still may be available for review by the viewer when reviewing a list of available personal channels. In still other embodiments, the existence of the second program on recording device 104 may be hidden from view.

Thus, what has been described is a method and apparatus encouraging audience flow.

What is claimed is:

1. A method comprising:
    a) accepting first viewer input for recording a first program; and
    b) recording the first program and a second program responsive to the first viewer input
    wherein the first program is recorded in a personal channel and the second program is recorded in a hidden channel.

2. A video playback device comprising:
    a) storage means for storing programs for playback;
    b) selection means for allowing selection by a viewer of a first program for recording; and
    c) control means for controlling the video playback device to record a second program responsive to the viewer selection of the first program for recording wherein the second program is linked to the first program.

3. A video recorder comprising:
    a) an input for receiving a video signal, the video signal comprising a plurality of programs;
    b) a storage device for storing selected ones of the plurality of programs;
    c) a processor; and
    d) a stored program for controlling the processor, the stored program including first instructions for accepting user input for selection of a first program to be stored and second instructions for causing a second program to be recorded responsive to the user input
    wherein the second program is linked to the first program.

4. A method for encouraging audience flow comprising:
    a) accepting viewer input for selection of a first program for recording;
    b) recording a second program responsive to selection of the first program for recording
    wherein the second program is linked with the first program.

5. The method as recited by claim 4 wherein the second program is broadcast before the first program.

6. The method as recited by claim 4 wherein the second program is broadcast after the first program.

* * * * *